United States Patent [19]
Sekine

[11] Patent Number: 6,038,579
[45] Date of Patent: Mar. 14, 2000

[54] DIGITAL SIGNAL PROCESSING APPARATUS FOR PERFORMING WAVELET TRANSFORM

[75] Inventor: Masatoshi Sekine, Tokyo, Japan

[73] Assignee: Kabushiki Kaisha Toshiba, Kawasaki, Japan

[21] Appl. No.: 09/002,916

[22] Filed: Jan. 5, 1998

[30] Foreign Application Priority Data

Jan. 8, 1997 [JP] Japan ................................. 9-001431

[51] Int. Cl.$^7$ ................................................. G06F 17/14
[52] U.S. Cl. ............................................. 708/400; 708/820
[58] Field of Search ....................................... 708/400, 820, 708/420

[56] References Cited

U.S. PATENT DOCUMENTS

| | | | |
|---|---|---|---|
| 5,124,930 | 6/1992 | Nicolas et al. | 364/485 |
| 5,347,479 | 9/1994 | Miyazaki | 708/400 |
| 5,355,510 | 10/1994 | Sekine | 395/800 |
| 5,526,299 | 6/1996 | Coifman et al. | 708/400 |

*Primary Examiner*—David H. Malzahn
*Attorney, Agent, or Firm*—Oblon, Spivak, McClelland, Maier & Neustadt, P.C.

[57] ABSTRACT

A digital signal processing apparatus comprises a sensor, a multi-valued binary level signal generator, a wavelet transform section, and a post processor. The signal generator receives analog signals output from the sensor and converts them to multi-valued binary level signals. The wavelet transform section has fundamental elements and threshold devices. The fundamental elements are provided at the nodes of a tree structure. Each threshold device is designed to receive at least two multi-valued signals and to output one binary signal, it receives the coefficients of the scaling functions output from the fundamental elements provided at the same level of the tree structure, for extracting the feature of the analog signal. The output signals of the wavelet transform section, i.e., the results of the wavelet transform, are input to the post processor. The apparatus can therefore perform signal processing including wavelet transform, at high speed without using large-scale hardware.

12 Claims, 6 Drawing Sheets

DIGITAL SIGNAL PROCESSING APPARATUS FOR PERFORMING WAVELET TRANSFORM

BACKGROUND OF THE INVENTION

1. Field of the Invention

The present invention relates to a digital signal processing apparatus which digitally processes analog signals, and more particularly to a digital signal processing apparatus for performing signal processing including orthogonal transform such as wavelet transform.

This application is based on Japanese Patent Application No. 9-001431, filed Jan. 8, 1997, the content of which is incorporated by reference.

2. Discussion of Background

So-called wavelet transform, which is a signal processing technique based on the wavelet theory, has been developed by combining short-time Fourier transform and matched filtering. Wavelet transform is defined by a mathematical formula, which is applied in many fields of technology. Various types of signal processing apparatuses which perform wavelet transform have been developed. Among them are:

1. An apparatus in which a DSP (Digital Signal Processor) performs wavelet transform by using a program describing the wavelet transform formula.
2. An apparatus in which continuous wavelet transform is performed by utilizing an optical phenomenon, thereby extracting spectra, and a neutral network determines the feature of the phenomenon from the extracted spectra.
3. An apparatus in which the wavelet transform formula is converted to binary data, and a digital circuit processes the binary data.

Of these signal processing apparatuses, the apparatus 1 is the most simple. An example of the apparatus 3, wherein wavelet transform is applied to image compression/expansion, is disclosed in U.S. Pat. No. 5,355,510 by the inventor of the present application.

The apparatus 1 executes a number of instructions, one by one, in order to achieve wavelet transform, and a great deal of time is therefore required to process signals. The apparatus 2 needs to have optical elements and is inevitably large in size. The apparatus 3 requires large-scale hardware to perform wavelet transform.

The conventional signal processing apparatuses which perform wavelet transform are disadvantageous in two respects. First, they are large in size. Second, they cannot perform wavelet transform at high speed.

BRIEF SUMMARY OF THE INVENTION

The present invention has been made in view of the foregoing. An object of the present invention is to provide a digital signal processing apparatus which is relatively small and which can yet perform digital signal processing including wavelet transform, at high speed and without using large-scale hardware.

Another object of the present invention is to provide a digital signal processing apparatus which can easily accomplish not only wavelet transform but also complex signal processing, by using converted signals.

According to the present invention, there is provided a digital signal processing apparatus which converts multi-valued analog signals to multi-valued binary level signals and which performs, on the binary level signals, a signal processing including wavelet transform.

Multi-valued analog signals are converted to multi-valued binary level signals, and the binary level signals are subjected to signal processing including wavelet transform. That is, the signals are processed at high speed, without using large-scale hardware. The apparatus has but hardware of a relatively small scale, because it needs to have only one data line unlike the conventional apparatus which performs wavelet transform on binary logic signals simply converted from an analog signal.

The digital processing apparatus according to the present invention has a tree structure. It comprises fundamental elements provided at the nodes of the tree structure, each designed to generate a scaling function and a wavelet function which are necessary to perform wavelet transform. Multi-valued binary level signals converted from analog signals are input to the fundamental elements arranged at the lowest level of the tree structure. Of the outputs of these elements, the scaling functions are input to the fundamental elements provided at the next higher level. Each of these fundamental elements adds the scaling functions output from two fundamental elements at the lower level, generating a scaling function, and subtracts one of the scaling function from the other scaling function, thereby generating a wavelet function. Further, each fundamental element at any node of the tree structure performs convolution on the input multi-valued binary level signals and the scaling function or the wavelet function.

Each fundamental element at any node has a bidirectional shift register which shifts data in synchronism with clock pulses generated while the input multi-valued binary level signals has a significant level.

The bidirectional shift registers in the fundamental elements at the same level of the tree structure are connected in series, and the data items stored in these shift registers are sequentially read out through the serially connected bidirectional shift registers.

The digital signal processing apparatus comprises a threshold device. Each threshold device receives the scaling functions output from the fundamental elements provided at one level of the tree structure and extracts the feature of the analog signal. The threshold device is of the type which receives two or more multi-valued signals and which outputs one binary signal. Preferably, it is of the type which can store data. For example, it may be an MOS gate element which has a floating gate and a plurality of input gate electrodes provided on an insulating film formed on the floating gate electrode.

Additional objects and advantages of the present invention will be set forth in the description which follows, and in part will be obvious from the description, or may be learned by practice of the present invention. The objects and advantages of the present invention may be realized and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A digital signal processing apparatus according to the present invention will be described, with reference to the accompanying drawings.

Figure 1:
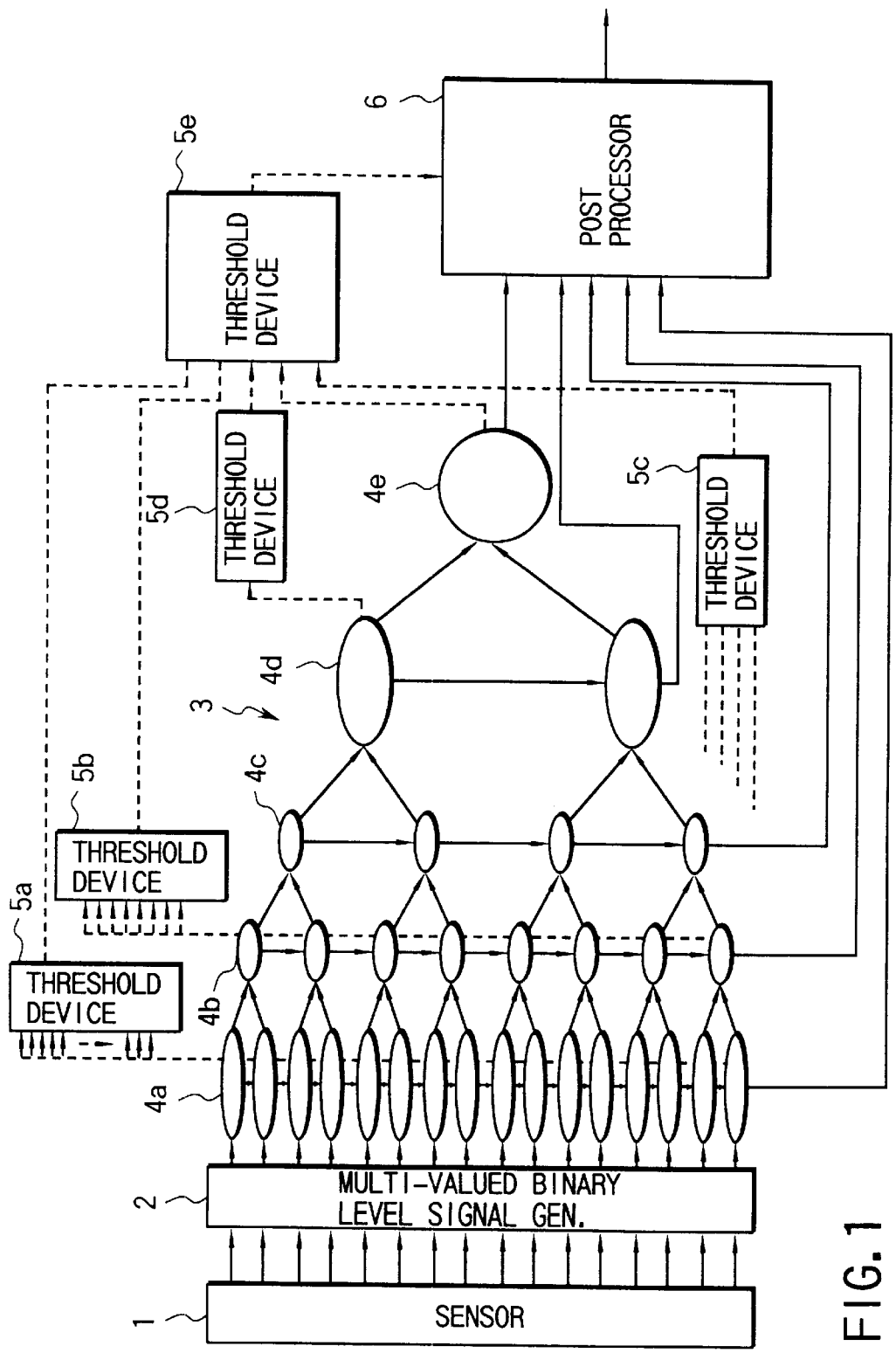
FIG. 1 is a block diagram of a first embodiment of a digital signal processing apparatus according to the present invention.
Figure 2:
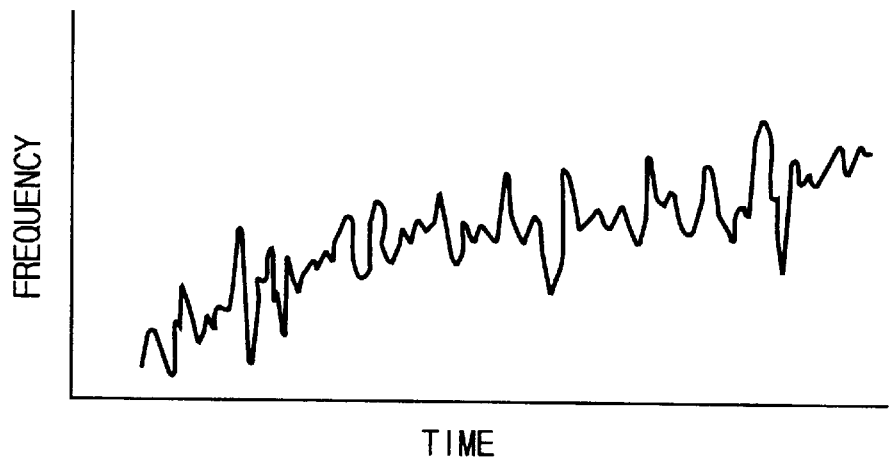
FIG. 2 is a diagram illustrating the waveform of an analog signal input to the apparatus shown in FIG. 1.

FIG. 1 is a block diagram showing the digital signal processing apparatus. As shown in FIG. 1, the apparatus has a sensor 1 which is a source of analog signals. The sensor 1 comprises, for example, an array of a plurality of imaging elements or microphones. The imaging elements generate video signals, and the microphones generates audio signals. The video signals or the audio signals of all the imaging elements or microphones are output from the sensor 1 at the same time. The video or audio signals are multi-valued analog signals. Their frequencies change with time as is illustrated in FIG. 2. The video or audio signals are input to a multi-valued binary level signal generator 2.

The multi-valued binary level signal generator 2 converts the input multi-valued analog signals to multi-valued binary level signals. More precisely, the generator 2 converts each input signal to a pulse-width modulation signal shown in FIG. 3A. As seen from FIG. 3, the pulse-width modulation signal has its pulse width changing with the level (amplitude) of the input analog signal.

The multi-valued binary level signal output from the generator 2 is input to a wavelet transform section 3. The wavelet transform section 3 converts the multi-valued binary level signal to a discrete multi-valued binary level signal, or pulse-number modulation signal shown in FIG. 3B. The section 3 then performs signal processing including wavelet transform on the discrete multi-valued binary level signal.

As FIG. 1 shows, the wavelet transform section 3 is a tree-structure device. It comprises fundamental elements 4a, 4b, 4c, 4d and 4e which are located at the nodes of the tree structure. The elements 4a are provided at the lowest level of the tree structure connected to the outputs of the multi-valued binary level signal generator 2. The elements at any higher level of the tree structure are provided in half the number of the elements at the immediately lower level. The tree structure has five levels, and sixteen fundamental elements 4a are located at the lowest level. Hence, eight elements 4b are provided at the second lowest level; four elements 4c at the third lowest level; two elements 4d at the fourth lowest level; and one element 4e at the highest level. The fundamental elements at each level are connected in series, and any adjacent two of the elements at each level are connected to one element at the next higher level.

The outputs of the fundamental elements 4a are connected to a threshold device 5a. The outputs of the fundamental elements 4b are connected to a threshold device 5b. The outputs of the fundamental elements 4c are connected to a threshold device 5c. The outputs of the fundamental elements 4d are connected to a threshold device 5d. The output of the fundamental element 4e is connected to a threshold device 5e. Also connected to the threshold device 5e are the outputs of the threshold devices 5a to 5d.

Further, the outputs of the elements 4a, those of the elements 4b, those of the element 4c, those of the element 4d and that of the element 4e are supplied to a post processor 6. Also supplied to the post processor 6 are the output of the threshold device 5e. The post processor 6 processes the output signals supplied from the wavelet transform section 3, thereby accomplishing coincidence process, pattern recognition, signal compression and the like.

Figure 4:
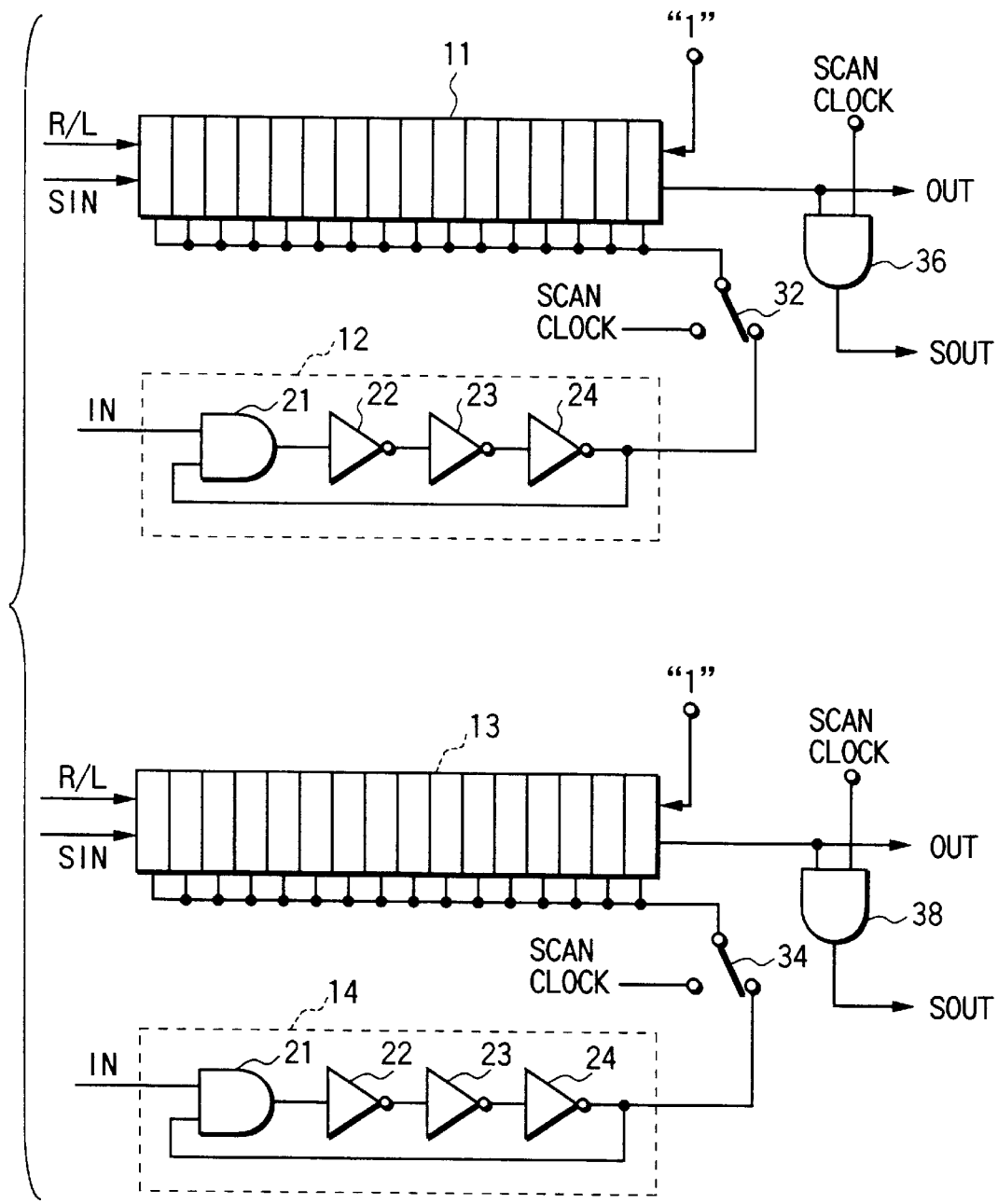
FIG. 4 is a block diagram showing in detail one of the fundamental elements which are incorporated in the apparatus shown in FIG. 1 and which are identical in structure.

The fundamental elements 4a, 4b, 4c, 4d and 4e are identical in structure. As shown in FIG. 4, each fundamental element comprises bidirectional shift registers 11 and 13 and clock signal generators 12 and 14. The clock signal generators 12 and 14 are connected to the shift registers 11 and 13, respectively. The bidirectional shift registers 11 and 13 may be replaced by barrel shifters.

Each of the clock signal generators 12 and 14 comprises an AND gate 21 and a ring oscillator. The ring oscillator comprises three inverters 22, 23 and 24. The AND gate 21 has two input terminals. The output of the ring oscillator is fed back to the first input terminal of the AND gate 21. The second input terminal of the AND gate 21 is a data input terminal IN. Thus, each clock signal generator 12 or 14 keeps generating clock pulses at prescribed intervals while the signal at the data input terminal IN remains at its significant level (i.e., "1" level).

The outputs of the clock signal generators 12 and 14 are supplied via selectors 32 and 34 to the clock terminals CK of the shift registers 11 and 13, respectively. A scan clock signal is also supplied to the selectors 32 and 34. The selectors 32 and 34 connect the shift registers 11 and 13 to the clock signal generators 12 and 14 while the digital signal processing apparatus remains in wavelet transform mode. The selectors 32 and 34 connect the registers 11 and 13 to the scan clock side while the apparatus remains in scan mode. Namely, the shift registers 11 and 13 of the fundamental elements at the same level in the tree structure are connected in series. The data in the shift registers are output through the serially connected shift registers while the apparatus stays in the scan mode. The scan clock signal is generated in the scan mode and is supplied to the shift registers 11 and 13.

Figure 3A:
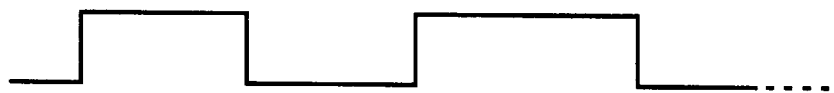
FIGS. 3A to 3C are diagrams depicting the waveforms of various signals generated in the apparatus shown in FIG. 1.
Figure 3B:

In each of the shift registers 11 and 13, the serial signal input through a serial input terminal SIN is shifted from one stage to the next stage, every time a clock pulse is supplied to the clock terminal CK. Therefore, each shift register generates a pulse-width modulation signal shown in FIG. 3A. In the shift register 11, the pulse-width modulation signal is supplied to the output terminal OUT and also to the scan output terminal SOUT through an AND gate 36. In the shift register 13, the pulse-width modulation signal is supplied to the output terminal OUT and also to the scan output terminal SOUT through an AND gate 38. The AND gates 36 and 38 receive the scan clock so that the pulse-number modulation signal as shown in FIG. 3B is output from the scan output terminals SOUT.

Figure 5:
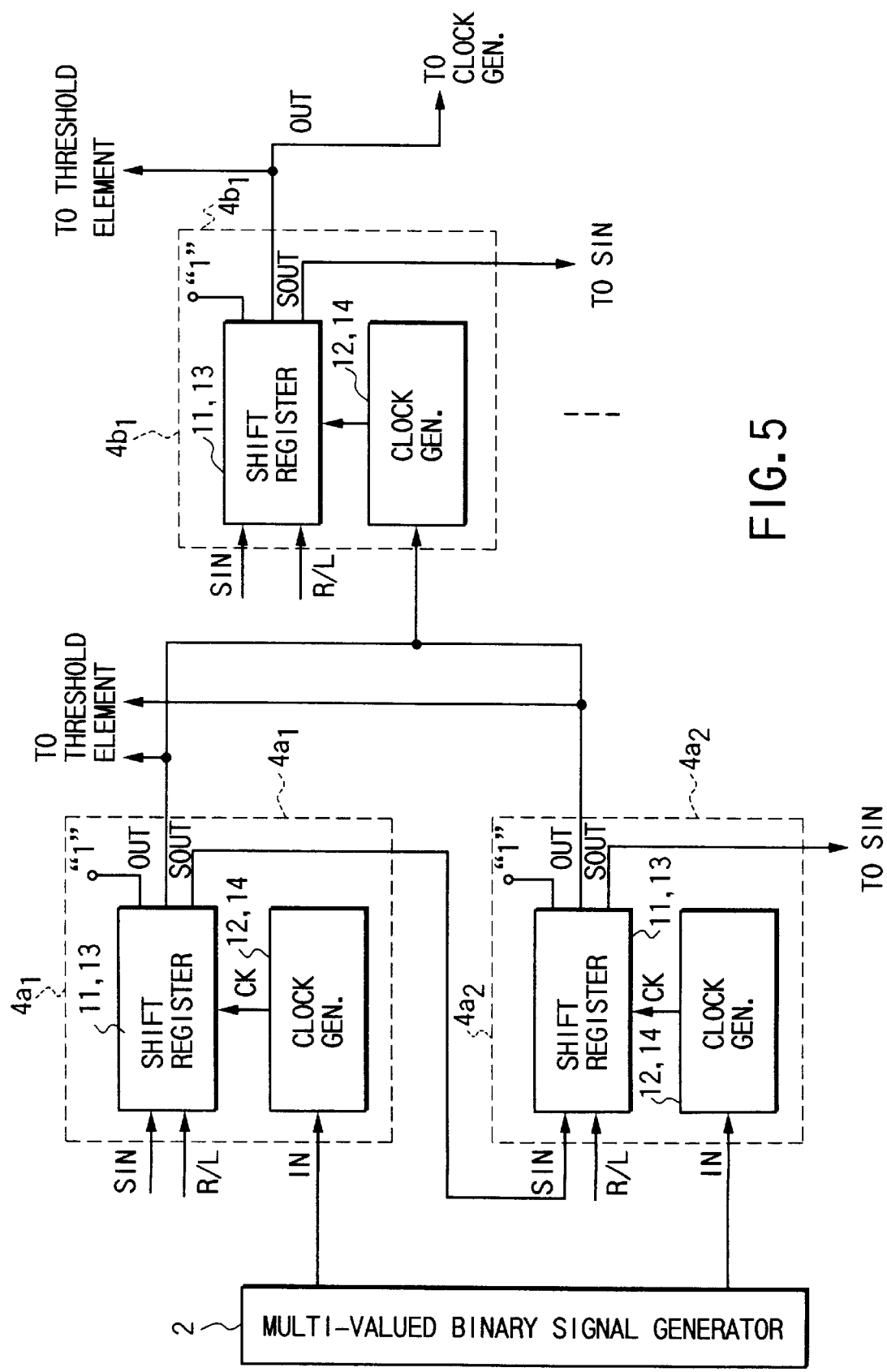
FIG. 5 is a block diagram illustrating the connection of the fundamental elements of the apparatus shown in FIG. 1.

As shown in FIG. 5, the multi-valued binary level signal from the multi-valued binary level signal generator 2 is supplied to the data input terminals IN of the fundamental elements $4a_1, 4a_2, \ldots$ arranged at the lowest level of the tree structure. The scan output terminals SOUT of the shift registers 11 and 13 of each fundamental element provided at each level are connected to the serial input terminals SIN of the shift registers 11 and 13 of the next fundamental element provided in the same level. The scan output terminals SOUT of the shift registers 11 and 13 of the last fundamental element located at each level are connected to the post processor 6. The scan output terminal SOUT of the fundamental element 4e at the highest level of the tree structure is directly connected to the post processor 6. Once the apparatus is set in the scan mode after wavelet transform mode, the post processor 6 reads data from the bidirectional shift registers 11 an 13 incorporated in the fundamental elements 4a, 4b, 4c, 4d and 4e and processes the input analog signal within a substantially same time of the original analog signal. If the shift registers 11 and 13 of the fundamental elements at the same level were not connected in series, and if the outputs of the shift registers 11 and 13 of the fundamental elements at the same level were supplied in parallel to the post processor 6, the apparatus would need to have much more connection lines, inevitably becoming a large-scale circuit.

The output terminal OUT of only the shift register 11 of each fundamental element at any level is connected to the threshold device 5a, 5b, 5c, 5d or 5e provided for that level. In other words, the interim results of the transformation of the signal accumulated in the bidirectional shift register 11 of each fundamental element are input to the associated threshold devices. The feature of the analog signal can thereby be extracted instantly.

The output terminals Out of the adjacent two shift registers 11 or 13 in each fundamental element of the same level in the tree structure are commonly connected to data input terminal IN of the clock generator 12 or 14 in each fundamental element of the next higher level in the tree structure.

The direction in which the shift registers 11 and 13 of each fundamental element shift data can be switched by a shift-direction switching signal R/L. Either register can shift data to the right (or shift out the data), effecting subtraction, and can shift data to the left (or shift in the data), performing addition. Data "1" is set in the last stage of either bidirectional shift register 11 and 13. Upon receipt of every clock pulse from the clock signal generator 12 or 14, either shift register shifts in the data "1" if the shift-direction switching signal R/L designates the shifting data to the left.

The operation of the digital signal processing apparatus will be explained.

Figure 6:
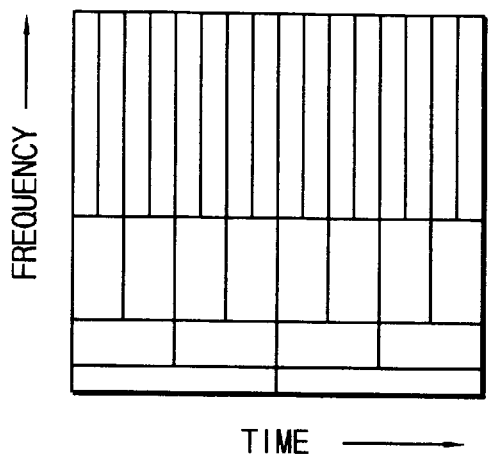
FIG. 6 is a diagram representing a region which defines a wavelet function.

First, the wavelet transform, which is a pre-process of a feature extracting process, will be described. Long known as methods of extracting the spectrum of an analog signal whose frequency changes with time as shown in FIG. 2 are matched filtering and short-time Fourier transform (also called "windowed Fourier transform"). These methods are combined and developed into wavelet transform. Wavelet transform consists in expanding an input signal by using a wavelet function defined in a rectangular region which has a time axis and a frequency axis as shown in FIG. 6. The wavelet function is originated from a scaling function.

A scaling function which is obtained by performing Haar transform, i.e., a kind of wavelet transform, will be explained with reference to FIGS. 7A to 7E. A wavelet function (i.e., a Haar function) will be explained with reference to FIGS. 8A to 8E.

Figure 7A:
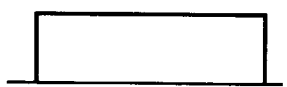
FIGS. 7A to 7E are diagrams for explaining a scaling function.
Figure 8A:
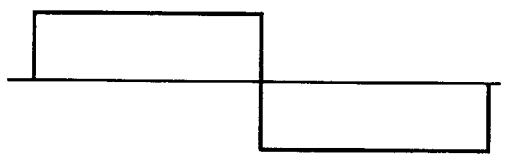
FIGS. 8A to 8E are diagrams for explaining a wavelet function.
Figure 7B:

Haar transform is a wavelet transform wherein use is made of a rectangular scaling function and a rectangular wavelet function (i.e., Haar function). FIG. 7A depicts a fundamental scaling function, whereas FIG. 8A illustrates a fundamental wavelet function. FIGS. 7B, 7C, 7D and 7E show four scaling functions compressed to ½, ¼, ⅛ and ¹⁄₁₆ of the fundamental scaling function shown in FIG. 7A, respectively. FIGS. 8B, 8C, 8D and 8E show four wavelet functions compressed to ½, ¼, ⅛ and ¹⁄₁₆ of the fundamental wavelet function, respectively.

Figure 8B:
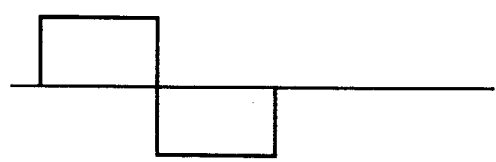
Figure 7C:
Figure 8C:
Figure 7D:
Figure 8D:
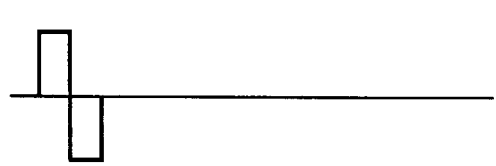
Figure 7E:
Figure 8E:

In the apparatus shown in FIG. 1, transform using the scaling function of FIG. 7E and the wavelet function of FIG. 8E is effected in the fundamental elements 4a provided at the fifth (lowest) level. Transform using the scaling function of FIG. 7D and the wavelet function of FIG. 8D is carried out in the fundamental elements 4b provided at the fourth level. illustrated in FIGS. 8A to 8E; it remains at the same value for a predetermined time. Hence, it suffices to detect an input signal at regular time intervals. This is equivalent to sampling of the input signal. Assume that the input signal is sampled at intervals of $\Delta T$ and that a sampled value $f(T_1)$ is obtained at time $T_1$. The sampled value is a multi-value. Thus, a plurality of data lines are required to transfer the binary data representing this value. That is, large-scale hardware must be used to transfer that binary data.

To avoid the use of large-scale hardware, the sampled value is converted to a multi-valued binary level signal (constituted by "0s" and "1s"). For example, such pulse-width modulation signal is shown in FIG. 3A. The pulse-width modulation signal representing the sampled value can be transferred through only one signal line. The addition of items of pulse-width modulation signal can be achieved by adding the widths of the pulses. Moreover, these items can be added by sending them through the same data line such that the pulses forming these data items do not overlap. Obviously, the hardware for transferring the binary data representing the sampled value can be reduced very much. Furthermore, the pulses forming the items of pulse-width modulation signal do not overlap, provided that these items are output at different times from the nodes of the wavelet transform section 3. Additional Transform utilizing the scaling function of FIG. 7C and the wavelet function of FIG. 8C is effected in the fundamental elements 4c provided at the third level. Transform using the scaling function of FIG. 7B and the wavelet function of FIG. 8B is performed in the fundamental elements 4d provided at the second level. And transform utilizing the scaling function of FIG. 7A and the wavelet function of FIG. 8A is effected in the fundamental element 4e provided at the first (highest) level.

A pair of fundamental function, i.e., a scaling function and a wavelet function, are compressed, step by step, thereby generating a normalized orthogonal base function. The input signal (of the type shown in FIG. 2) is expanded by using the base function, thereby accomplishing wavelet transform. The wavelet transform is represented as: $F = \int fW$, where W is the base function and f is the input signal. The expansion of the input signal f is expressed as: $f = \Sigma FW$. Each of the fundamental elements 4a to 4e of the wavelet transform section 3 generates the product $F (= \int fW)$.

In the digital signal processing apparatus (FIG. 1), a Haar function is applied. The present invention is effective even if the Haar function may be replaced by any other wavelet function designed to enhance the accuracy of the wavelet transform. The Haar function is represented by a rectangle as circuits such as overlap-detecting circuits need not be used at all.

In the apparatus shown in FIG. 1, the multi-valued binary level signal generator 2 converts the output analog signal of the sensor 1 to a multi-valued binary level signal, or pulse-width modulation signal of the type shown in FIG. 3A. The multi-valued binary level signal is input to the input terminals IN of the clock signal generators 12 and 14 of each fundamental element 4a which is provided at the lowest level of the tree structure of the wavelet transform section 3. The multi-valued level signals from the output terminals OUT of the shift registers 11 and 13 of any two adjacent fundamental elements 4a are sequentially supplied, in time-division, to the data input terminals IN of the clock signal generators 12 and 14 of one fundamental element 4b located at the fourth level.

Similarly, the multi-valued level signals at the output terminals OUT of the shift registers 11 and 13 of any two adjacent fundamental elements 4b provided at the fourth level are sequentially supplied to the data input terminals IN of the clock signal generators 12 and 14 of one fundamental element 4c arranged at the third level. The multi-valued level signals at the output terminals OUT of the shift registers 11 and 13 of any two adjacent fundamental elements 4c provided at the third level are sequentially supplied to the data input terminals IN of the clock signal generators 12 and 14 of one fundamental element 4d located at the second level. The multi-valued level signals at the output terminals OUT of the shift registers 11 and 13 of the fundamental elements 4d provided at the second level are sequentially supplied to the data input terminals IN of the clock signal generators 12 and 14 of the fundamental element 4e located at the first level.

Thus, the multi-valued level signal output from the multi-valued binary level signal generator 2 is input to the data input terminals IN of the clock signal generators 12 and 14 of each fundamental element 4a provided at the fifth level, and the multi-valued level signal output from any fundamental element arranged at any level is input to the data input terminals IN of the clock signal generators 12 and 14 of one fundamental element provided at the next higher level. The clock signal generators 12 and 14 of each fundamental element located at any level of the tree structure generate clock pulses as is illustrated in FIG. 3B while the multi-valued binary level signals (FIG. 3A) supplied to their data input terminals IN remain at the significant value of "1". The clock pulses thus generated are supplied to the bidirectional shift registers 11 and 13.

The data-shifting direction of the bidirectional shift register 11 has been switched to the leftward direction in accordance with a shift-direction switching signal R/L. The shift register 11 therefore shifts in the input data "1" every time it receives a clock pulse. The shift register 11 encodes the pulse width of the multi-valued binary level signal, generating a signal representing the number of "1s" having the same weight, and stores this signal, i.e., a pulse-number modulation signal.

In the fundamental element 4a at the lowest level, the input multi-valued binary level signal is encoded with the maximum resolution and stored in the shift registers 11. If the clock signal generator 12 is a counter, it can count "1s" contained in the binary level signal, thereby encoding the signal by applying binary weighting. The clock signal generator 12 may be designed in accordance with the value the signal can take (e.g., the dynamic range, resolution, etc. of the input signal).

In each of the fundamental elements 4b, 4c, 4d and 4e, the bidirectional shift register 11 and the clock signal generator 12 add the multi-valued binary level signals supplied from the data output terminals OUT of two adjacent fundamental elements located at the immediately lower level. On the other hand, the bidirectional shift register 13 and the clock signal generator 14 subtract one of these multi-valued binary level signals from the other thereof.

How the addition of multi-valued binary level signals is accomplished will be described. In the first fundamental element $4b_1$, the clock signal generator 12 receives, at its data input terminal IN, the multi-valued binary level signal supplied from the data output terminal OUT of the first fundamental element $4a_1$ arranged at the lowest level. While the binary level signal remains at "1" level, the clock signal generator 12 generates a clock signal. The bidirectional shift register 11 shifts in "1" in response to the clock signal, thereby encoding the pulse width of the binary level signal into a signal which represents the number of "1s" stored in the shift register 11.

Next, the clock signal generator 12 receives, at its data input terminal IN, the multi-valued binary level signal supplied from the data output terminal OUT of the second fundamental element $4a_2$. While this binary level signal remains at "1" level, the clock signal generator 12 generates a clock signal. The bidirectional shift register 11 shifts in "1" in response to the clock signal, thereby encoding the pulse width of this binary level signal into a signal which represents the number of "1s" stored in the shift register 11.

As a result, the bidirectional shift register 11 of the fundamental element $4b_1$ stores the sum of the binary level signals supplied from the data output terminals OUT of the fundamental elements $4a_1$ and $4a_2$ at the lower level. This sum represents the number of "1s". The contents of this shift register 11 are output from the data output terminal OUT of the fundamental element $4b_1$ and are supplied to the data input terminal IN of the clock signal generator 12 of the first fundamental element $4c_1$ at the higher level.

In the other fundamental elements ($4b_3$ et seq.) at the same level, and in the fundamental elements 4c, 4d and 4e at the higher levels, the addition of multi-valued binary level signals is accomplished in the same way as described above. The sum stored in the bidirectional shift register 11 of each fundamental element has been obtained by converting the input signal using the scaling function $\phi(x)$ as follows:

$$a^j_L \phi_L (2x) = (a^j_{L-1} \phi_{L-1} (x_i) + a^j_{L-1} \phi_{L-1} (x_{i+1}))/2 \qquad (1)$$

where L is the level at which the fundamental element is provided, L−1 is the level immediately lower than the level L, and i and i+1 are two adjacent fundamental elements arranged at the L−1 level.

Here, x is an input variable, and $a^j_L$ and $a^j_{L-1}$ are coefficients which have been obtained by performing convolution on the multi-valued binary level signals and the scaling function.

Any signal that has been converted by using the scaling function propagates from the lower level of the tree structure toward the higher level, along the paths indicated by solid lines in FIG. 1, and is finally input to the post processor 6. The signal is also supplied to the threshold devices 5a to 5e, along the paths indicated by broken lines in FIG. 1.

The signal converted by using the scaling function in the shift register 11 in any fundamental element 4a at the fifth (lowest) level is supplied to the threshold device 5a. The signal converted by using the scaling function in the shift register 11 in any fundamental element 4b at the fourth level is supplied to the threshold device 5b. The signal converted by using the scaling function in the shift register 11 in any fundamental element 4c at the third level is supplied to the threshold device 5c. The signal converted by using the scaling function in the shift register 11 in either fundamental element 4d at the second level is supplied to the threshold device 5d. And the signal converted by using the scaling function in the shift register 11 in the fundamental element 4e at the first (highest) level is supplied to the threshold device 5e. Supplied also to the threshold device 5e are the outputs of the threshold devices 5a, 5b, 5c and 5d.

It should be noted that the division by two in the equation (1) is achieved by down sampling. The down sampling is accomplished by inputting the coefficients $a^j_{L-1}$ output from any two adjacent fundamental elements at the L−1 level to one fundamental element provided at the level L, thereby reducing the sampling frequency to a half.

How the subtraction of multi-valued binary level signals is accomplished will be now described. In the first fundamental element $4b_1$, the clock signal generator 14 receives, at its data input terminal IN, the multi-valued binary level signal supplied from the data output terminal OUT of the first fundamental element $4a_1$ located at the lower level. While the binary level signal remains at "1" level, the clock signal generator 14 generates a clock signal. The bidirectional shift register 13 shifts in "1" in response to the clock signal, thereby encoding the pulse width of the binary level signal into a signal which represents the number of "1s" stored in the shift register 13.

Then, the clock signal generator 14 receives, at its data input terminal IN, the multi-valued binary level signal supplied from the data output terminal OUT of the second fundamental element $4a_2$. While this binary level signal remains at "1" level, the clock signal generator 14 generates a clock signal. The bidirectional shift register 13 shifts out "1" in response to the clock signal. The binary level signal supplied from the data output terminal OUT of the second fundamental element $4a_2$ is thereby subtracted from the binary level signal supplied from the data output terminal OUT of the first fundamental element $4a_1$. The difference between these binary level signals, which represents the number of "1s", is stored in the shift register 13. The contents of this shift register 13 are output from the data output terminal OUT of the fundamental element $4b_1$ and are supplied to the data input terminal IN of the clock signal generator 14 of the first fundamental element $4c_1$ provided at the higher level.

In the other fundamental elements ($4b_3$ et seq.), at the same level and in the fundamental elements 4c, 4d and 4e at the other levels, the subtraction of multi-valued binary level signals is accomplished in the same way as described above. The difference stored in the bidirectional shift register 13 of each fundamental element has been obtained by converting the input signal by using the wavelet function φ(x) as follows:

$$b^j_L \phi_L(2x) = (b^j_{L-1} \phi_{L-1}(x_i) + b^j_{L-1} \phi_{L-1}(x_{i+1}))/2 \quad (2)$$

where L is the level at which the fundamental element is provided, L−1 is the level immediately lower than the level L, and i and i+1 are two adjacent fundamental elements arranged at the L−1 level.

Here, x is an input variable, and $b^j_L$ and $b^j_{L-1}$ are coefficients which have been obtained by performing convolution on the multi-valued binary level signals and the wavelet function.

Any signal that has been converted by using the wavelet function propagates from the lower level of the tree structure toward the higher level, along the paths indicated by solid lines in FIG. 1, and is finally input to the post processor 6.

The threshold devices 5a, 5b, 5c, 5d and 5e are designed to receive two or more data signals and to conduct threshold process on each input data signal, thereby to extract the feature of the input data signal. The weighting value each threshold device applies to the input data signals may be fixed or variable, or may be adjusted in accordance with the learning rules of a neural network.

Figure 9:
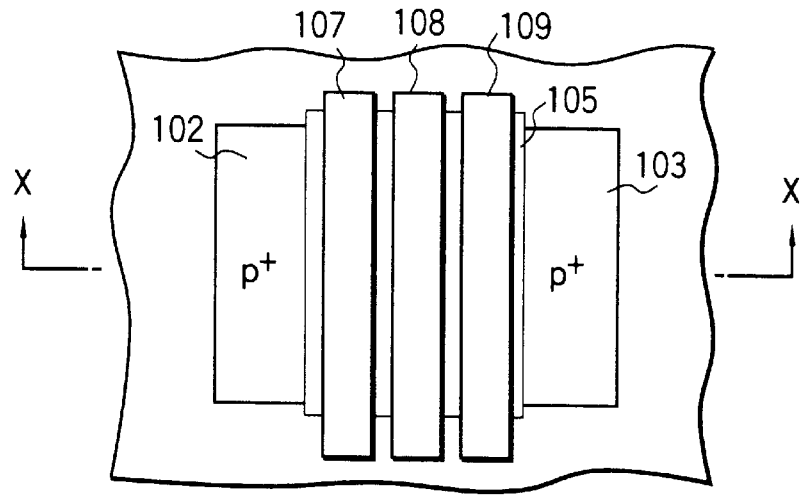
FIG. 9 is a plan view of one of the threshold devices incorporated in the apparatus shown in FIG. 1.

The threshold devices 5a to 5e are of the type which receives two or more multi-valued signals and which outputs one binary signal. One of the threshold devices 5a to 5e will be described with reference to FIGS. 9 and 10. FIG. 9 is a plan view of one of the device, and FIG. 10 is a sectional view thereof, taken along line X—X in FIG. 9.

Figure 10:
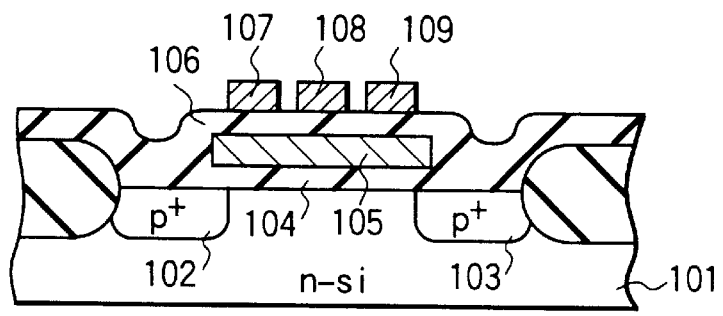
FIG. 10 is a sectional view of the threshold device illustrated in FIG. 9.
Figures 11A, 11B:
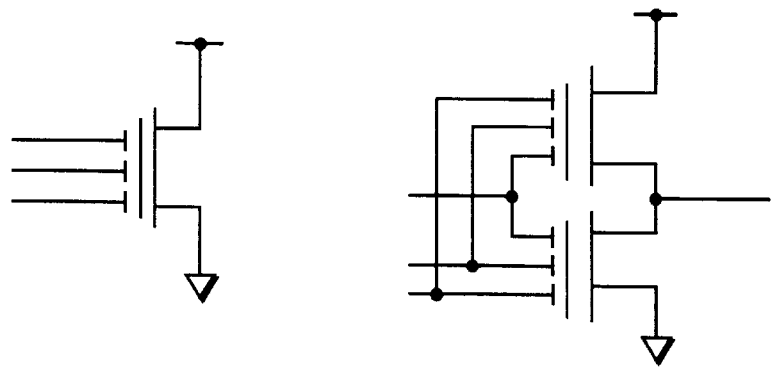
FIGS. 11A and 11B are two alternative equivalent circuit diagrams of the threshold device.

As may be understood from FIGS. 9 and 10, the threshold device is a three-input programmable MOS gate element which has the P-channel PROM structure disclosed in Japanese Patent Publication (KOKOKU) No. 5-3173. How the P-channel MOS gate element is manufactured will be explained, thereby to describe the structure of the MOS gate element.

A first gate oxide film 104, or a first insulating film, is formed on an n-type silicon substrate 101. A floating gate electrode 105 is formed on the first gate oxide film 104. Using the electrode 105 as a mask, impurities are diffused into the substrate 101. A $p^+$-type source 102 and a drain 103 are thereby formed in the surface of the substrate 101. Thereafter, a second gate oxide film 106, or a second insulating film is formed on the substrate 101 and the floating gate electrode 105. Input gate electrodes 107, 108 and 109 are formed on the second gate oxide film 106, right above the floating gate electrode 105. An interlayer insulating film (not shown) is formed in the entire upper surface of the resultant structure. Contact holes are made in the interlayer insulating film, exposing the input gate electrodes 107, 108 and 109. The contact holes are filled with metal, forming connecting wires. The P-channel MOS gate element is thereby manufactured.

As seen from FIG. 9, the input gate electrodes 107, 108 and 109 extend at right angles to the channel of the MOS gate element. Nonetheless, they may extend parallel to the channel. This is because each input gate electrode only needs to achieve capacitive coupling with the floating gate electrode 105.

The potential Vt of the floating gate electrode 105 is given as follows:

$$Vt = (C_1 \cdot V_1 + C_2 \cdot V_2 + C_3 \cdot V_3)/C_{total}$$

where $V_1$, $V_2$ and $V_3$ are the potentials of the electrodes 107, 108 and 109, respectively, $C_1$ is the static capacitance between the electrode 107 and the floating gate electrode 105, $C_2$ is the static capacitance between the electrode 108 and the electrode 105, $C_3$ is the static capacitance between the electrode 109 and the electrode 105, and $C_{total}$ is the sum of the capacitances $C_1$, $C_2$ and $C_3$.

The threshold voltage of the MOS gate element changes, depending upon the potentials of the input gate electrodes 107, 108 and 109. Having this operating characteristic, the MOS gate element can be used as a threshold device. The MOS gate element may be provided with a mechanism for injecting an electric charge into the floating gate electrode 105. If so, the weighting value which the MOS gate element gives to input data signals can be easily learned by using a neural network.

The threshold devices 5a, 5b, 5c, 5d and 5e are not limited to MOS gate elements of the type shown in FIGS. 9 and 10. Instead, they may be logic elements constituted by logic gates.

The functional advantages of the digital signal processing apparatus shown in FIG. 1 will be described below.

The multi-valued binary level signal generator 2 generates multi-valued binary level signals at the maximum resolution from the analog signal generated by the sensor 1. The multi-valued binary level signals are input to the wavelet transform section 3. The wavelet transform section 3 performs signal processing (including wavelet transform) on the multi-valued binary level signals. In the section 3, the signals are combined together, as they propagate through the fundamental elements 4a, 4b, 4c, 4d and 4e provided at the nodes of a tree structure, from the lowest level to the highest level of the tree structure.

The feature of the analog signal is expressed in scaling function values and wavelet function values at the nodes of the tree structure, by means of the fundamental elements. The distribution pattern of wavelet function values is input to the threshold devices 5a, 5b, 5c, 5d and 5e and detected thereby.

The feature of the analog signal is combined as the multi-valued binary level signals propagate through the fundamental elements 4a, 4b, 4c, 4d and 4e, from the lowest level to the highest level of the tree structure. The feature which the analog signal presents over a wide range is thereby extracted in substantial real time, though not so accurately. The extraction of the feature is programmed by connecting the fundamental elements 4a, 4b, 4c, 4d and 4e and the threshold devices 5a, 5b, 5c, 5d and 5e by wires in a particular manner. The weighting values added to the signals input to the threshold devices 5a, 5b, 5c, 5d and 5e may be changed, thereby to alter dynamically the sensitivity with which each threshold device detects the feature of the analogy signal.

After the feature of the signal is extracted, the coefficients of wavelet functions at the nodes of the tree structure may be acquired one by one through the wires which connect the fundamental elements in series. The coefficients may be used, thereby to synthesize the waveform of the analog signal. That is, the waveform of the analog signal can be restored. It is easy to divide the waveform thus restored and to process the waveform into a standard waveform.

It is the post processor 6 that restores the waveform of the analog signal. The post processor 6 can be a multi-valued binary level signal processor which comprises logic circuits. This is because the apparatus (FIG. 1) is compatible with logic circuits since multi-valued binary level signals (i.e., pulse-width modulation signal and pulse-number modulation signal) are processed in the apparatus. The post processor 6 can therefore be reliably connected with a digital signal processing system such as the conventional microprocessor.

In the apparatus (FIG. 1), the feature of the small fragments of the analog signal is extracted at high speed by means of hardware, in spite of the large-scale calculation involved. The feature thus extracted is combined into reliable feature data, by means of software.

The present invention is not limited to the embodiment shown in FIG. 1 and described above. Various changes and modifications can be made as will be described below.

(1) The fundamental elements incorporated in the wavelet transform section 3 may be designed to process multi-valued binary level signals, each composed of a combination of the scaling values of scaling functions, the wavelet values of wavelet functions, the displacement of a wavelet and the amplitudes of the scaling and wavelet functions.

(2) The invention can be applied to an apparatus which performs signal processing including short-time Fourier transform. In this case, each fundamental element processes multi-valued binary level signals, each composed of an identification number of a window, a frequency and the amplitude of an energy spectrum at the frequency.

Figure 3C:

(3) The multi-valued binary level signal generator 2 may convert the multi-valued analog signal to a multi-valued binary level signal which consists of relatively small number of pulses as shown in FIG. 3C, which have been generated at the leading and trailing edges of the pulse-width modulation signal illustrated in FIG. 3A.

(4) The multi-valued binary level signal generator 2 may generate pulse-number modulation signals, not pulse-width modulation signals, from the input analog signals. If this is the case, each fundamental element need not have clock signal generators 12 and 14.

As has been described, the digital signal processing apparatus according to the present invention converts a multi-valued analog signal to a multi-valued binary level signal such as pulse-width modulation signal and then perform signal processing (including wavelet transform) on the multi-valued binary level signal. The apparatus can therefore be small and can yet digital signal processing at high speed. The apparatus needs to have only one data line, unlike the conventional apparatus which performs wavelet transform on binary logic signals simply converted from an analog signal. Hence, the apparatus has but hardware of a relatively small scale.

Additional advantages and modifications will readily occur to those skilled in the art. Therefore, the present invention in its broader aspects is not limited to the specific details and representative embodiments shown and described herein. Accordingly, various modifications may be made without departing from the spirit of scope of the general inventive concept as defined by the appended claims and their equivalents.

I claim:

1. A digital signal processing apparatus comprising:
   signal converting means for converting an input analog signal to a multi-valued binary level signal; and
   a plurality of fundamental elements provided at nodes of a tree structure, each of the fundamental elements performing a first convolution with respect to an input signal and a predetermined scaling function and a second convolution with respect to the input signal and a predetermined wavelet function to wavelet-transform the input signal,
   wherein the multi-valued binary level signal output from said signal converting means is supplied to the fundamental elements provided at a lowest level of the tree structure, a result of wavelet-transform by fundamental elements at a given level is supplied to fundamental elements at a next higher level, and the scaling function and the wavelet function being determined based on a level of the fundamental elements in the tree structure.

2. An apparatus according to claim 1, wherein each of said fundamental element has bidirectional shift registers which shift data in synchronism with clock pulses generated while the input multi-valued binary level signals has a significant level.

3. An apparatus according to claim 2, in which the bidirectional shift registers in the fundamental elements at the same level of the tree structure are connected in series, and the data items stored in these shift registers are sequentially read out.

4. An apparatus according to claim 2, wherein bidirectional shift registers of fundamental elements at the same level of the tree structure are connected in series, and the data item stored in respective serially connected bidirectional shift registers are sequentially read out.

5. An apparatus according to claim 1, further comprising a plurality of threshold devices, each designed to receive at least two multi-valued binary level signals and to output one binary signal, for receiving the scaling functions output from the fundamental elements provided at one level of the tree structure and for extracting feature of the analog signal.

6. An apparatus according to claim 5, wherein said threshold devices are capable of storing data.

7. An apparatus according to claim 6, wherein each of said threshold devices is an MOS gate element which has a floating gate and a plurality of input gates provided on an insulating film formed on the floating gate electrode.

8. A digital signal processing apparatus comprising:
   a signal generator configured to convert an input analog signal to a multi-valued binary level signal; and
   a plurality of fundamental elements provided at nodes of a tree structure, wherein each of the fundamental elements performs a first convolution with respect to an input signal, a predetermined scaling function and a second convolution with respect to the input signal, and a predetermined wavelet function to wavelet-transform the input signal,
   wherein the multi-valued binary level signal output from said signal generator is supplied to the fundamental elements provided at a lowest level of the tree structure, a result of the wavelet-transform by fundamental elements at a given level is supplied to fundamental elements at a next higher level, and the scaling function and the wavelet function are determined based on a level of the fundamental elements in the tree structure.

9. An apparatus according to claim 8, wherein each of said fundamental elements includes bidirectional shift registers configured to shift data in synchronism with clock pulses generated while the input multi-valued binary level signals maintain an ON state.

10. An apparatus according to claim 8, further comprising:
    a plurality of threshold devices, wherein each threshold device is configured to receive at least two multi-valued binary level signals and to output one binary signal, to receive the scaling functions output from the fundamental elements provided at one level of the tree structure, and to extract a feature of the analog signal.

11. An apparatus according to claim 10, wherein said threshold devices are configured to store data.

12. An apparatus according to claim 11, wherein each of said threshold devices is a MOS gate element which includes a floating gate and a plurality of input gates provided on an insulating film formed on the floating gate electrode.

* * * * *